United States Patent Office 3,522,140
Patented July 28, 1970

3,522,140
ASBESTOS-FOAM LAMINATES
Rowland S. Hartzell, Gibsonia, and Gene Gerek, Cheswick, Pa., assignors to PPG Industries, Inc., a corporation of Pennsylvania
Filed Mar. 29, 1968, Ser. No. 717.074
Int. Cl. B32b 13/12; C09j 7/02
U.S. Cl. 161—160                                    14 Claims

ABSTRACT OF THE DISCLOSURE

Durable sheet products are provided by coated asbestos sheet material adhered to a cellular foam substrate. In preferred embodiments a vinyl foam, a polyurethane foam or polystyrene foam is produced in contact with asbestos paper coated with an organic coating composition; in some cases the foam has an adhesive layer on the exposed surface or the coating on the asbestos is an adhesive.

---

Products comprising cellular foams are becoming of increasing importance in many varied applications. For example, foam-filled and foam-backed materials are used in insulating panels, upholstery, flooring, etc. For the most part, the foam is employed as an interlayer or substrate for other materials which may or may not be adherently attached to the foam. Plastics, metals or metal foils and various coating materials are applied to the foam, in many cases using an adhesive or cement.

The present invention provides foam laminates of unique properties in which coated asbestos sheet material is adherently laminated to a cellular foam substrate. Such laminates have superior heat and flame resistance, durability and similar properties, and by use of various coatings on the asbestos sheet material provide the foam with a highly protective and highly decorative surface. The products herein can be used as flooring materials, insulating or sound-proofing materials, upholstery, wall coverings or panels, and in other applications in which their unique combination of properties is desired.

The asbestos-foam laminates herein can be used alone or over other substrates to which they can be attached, if desired, with an adhesive. The back or exposed surface of the foam can be provided with an adhesive layer to facilitate its use in such a manner.

Figure 1:
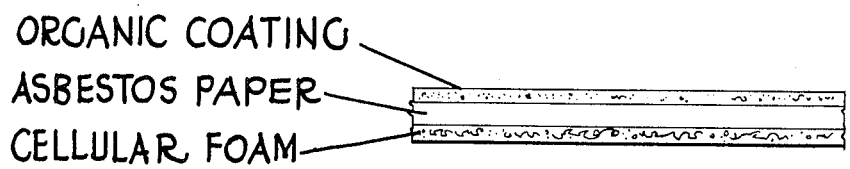

Referring now to the drawing, FIG. 1 illustrates the coated asbestos-foam laminates of the invention; in the embodiment shown asbestos paper having an organic coating on one side is bonded to a cellular foam substrate. Such coated asbestos-foam laminates are suitable, for example, for flooring, decorative wall covering or panels, insulating panels, protective coverings, tops for furniture or counters, and the like.

Figure 2:
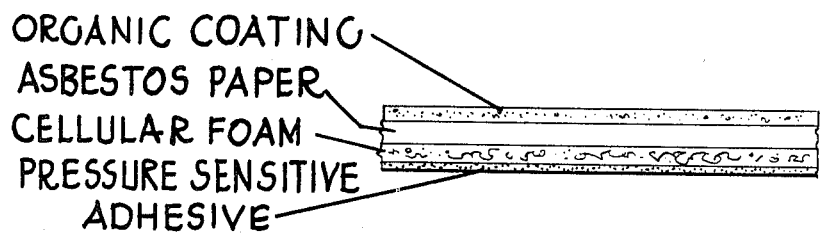

FIG. 2 shows another embodiment, wherein cellular foam in sheet form has one major surface adhered to asbestor paper and the other major surface with a layer of adhesive, the asbestos being coated with an organic coating on its exposed surface. Such adhesive asbestos-foam laminates are useful as self-adhesive wall or floor covering and other such products suitable for home or industrial use.

Figure 3:
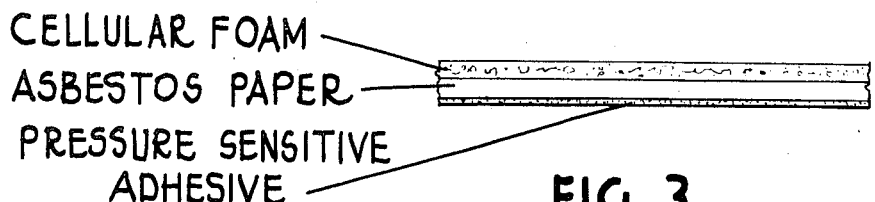

FIG. 3 shows still another embodiment in which cellular foam is bonded to asbestos paper, the asbestos paper having a pressure-sensitive adhesive on its other major surface. Such products are useful as self-adhesive sound-proofing panels or as decorative padding for automobile interiors and the like. If desired, the exposed surface of the cellular foam can be provided with a decorative and/or protective coating.

The foam component of the laminates herein can be made of essentially any stable cellular foam material, i.e. a material which has numerous cells or voids permanently dispersed throughout its mass (by "permanently" is meant lasting for a reasonably long period, as opposed to temporary foams arising from agitation etc.). The foam should be obtainable in sheet form; the particular type of foam is chosen by consideration of the desired properties for the particular application intended.

Preferred cellular foams are foamed resinous organic materials, and particularly polyurethane foams, vinyl chloride polymer foams, and polystyrene foams, although there can also be used other resinous foams, such as epoxy foams, phenolic resin foams, urea-formaldehyde resin foams, silicone resin foams, acrylic resin foams, cellulose acetate foams, cellular rubber latexes, foam rubber, acrylonitrile-butadiene-styrene copolymer foams, polyester foams, polycarbonate foams, polyamide foams, polyethylene foams, and the like. Synthetic foams, such as those made by dispersing hollow microspheres made of phenolic resin or silica in a binder, are also useful for certain purposes, as are inorganic foams, such as cellular glass or refractory oxide foams produced by firing an oxide-filled cellular foam.

The cellular foam employed in the invention can be rigid or flexible depending upon the intended use for the product. Insulating panels, for example, are advantageously made of rigid foam materials for ease of handling, whereas flooring and upholstery usually contain flexible foam products in order to impart added resilience to the material. The preferred products, i.e. those in which the advantages of the invention are realized to the fullest extent, generally are made using resilient, flexible foams.

Various methods of producing the aforesaid foams are well known in the art. Generally speaking, a foamable composition is provided by combining a fluid molten material which becomes solid upon curing or cooling with a blowing or frothing agent, and then allowing or causing this composition to expand the fluid material to a low-density state by formation of cells or voids throughout the material. The low-density state in which cells or voids are provided throughout the material is preserved by curing or cooling the cellulated mass. The blowing or frothing agent can be a gas or a material which volatizes, reacts or decomposes to form a gas. Other methods which may be used to produce useful foams include sintering, leaching or burning out dispersed materials, or dispersing preformed cellular particles in a resinous binder.

The asbestos sheet material employed in the laminates herein can be any sheet material which contains asbestos as a major functional constituent, but it is greatly preferred to use a non-woven asbestos sheet. Such non-woven sheet materials are ordinarily made of asbestos fibers bonded together with a binder to form an asbestos paper. Generally, such paper has a thickness of from about 5 to about 50 mils. The amount of binder present in these papers varies considerably; in some cases little or no binder is employed, whereas in other instances the amount of binder is substantial.

Asbestos fabrics and other woven forms of asbestos can sometimes be used in the present invention but are not usually desirable because of the non-continuous nature of fabrics and woven materials in general and the interstices therein which permit penetration of the coating composition and/or foam through the fabric. This is particularly troublesome with low viscosity foaming or coating compositions, such as latices or dispersions, which are often highly desirable for use herein.

The ordinary commercial types of nonwoven asbestos papers can be utilized herein and these are ordinarily produced by methods similar to those employed in production of conventional cellulosic papers. The types of binders utilized include natural or synthetic rubber-based binders, acrylic resins, polyvinyl chloride, and other natural and synthetic gums and glues. In some cases, a sizing material, such as casein or starch, is used to coat the fibers or the sheet material. In some papers no binder is used; in such instances a small amount of size may be applied and aids in forming the sheet. The choice of binder is based upon considerations such as the use for which the product is designed and the coating or adhesive to be applied. For example, acrylic resin binders are most often used, but where a fire-retardant product is desired a non-flammable binder, such as poly(vinyl chloride) or a vinyl chloride-vinyl acetate copolymer should be used. Vinyl chloride polymer binders should also be employed directly under poly(vinylidene fluoride) coatings because better resistance properties are obtained, probably due to better compatibility.

Various nonwoven asbestos sheets which contain other fibers and materials, such as cellulose acetate fibers, glass fibers, wire, microspheres, etc., can also be employed. In some instances, the nonwoven asbestos sheet may contain a layer of another substance, such as glass fibers or other reinforcement, interposed between layers of asbestos.

The asbestos itself can be of any of the mineral materials which are encompassed within the meaning of this term. Chrysotile is the most common type of asbestos material, but other mineral species, such as crocidolite, amosite, anthophyllite, termolite and actinolite, can also be included. Asbestos is, in general, composed of hydrated silicates in metamorphic form and is obtained from certain types of silica-bearing mineral rocks.

In the preferred process of producing the asbestos-foam laminates of the invention, a foamable composition (or the components thereof) is placed in contact with the asbestos sheet material, and the foam is allowed to form while maintaining such contact. The celular foam produced upon hardening adheres directly to the asbestos sheet material. The process can be carried out in a mold, to produce a desired shape, or on a moving web of asbestos sheet material, or in some cases, with the asbestos sheet material pre-positioned in an article or structure. The foam-forming composition can be applied to the surface of the asbestos by pouring, spraying, roll-coating (e.g. with doctor rolls) or by any other means which provides a layer of the desired uniformity. Depending upon the type of foam and the particular blowing agent and other components, the foam may form spontaneously at ambient temperatures or it may be necessary to heat the composition. For example, in the case of vinyl foams heating at 300° F. to 500° F. for 1 to 15 minutes is usually carried out.

Thus, in producing the laminates of the invention, it is not necessary to employ an adhesive or cement in adhering the asbestos sheet material to the foam substrate, although it will be recognized that an adhesive can be employed where a pre-formed foam is used. This may be desirable in the case of certain types of foams or in some desired applications.

The preferred process of producing these laminates by forming the foam in contact with the asbestos sheet material, whereby the foam as produced adheres directly to the asbestos sheet, provides an important advantage in the present products not only in the process, which is obviously much easier than would be the case if an adhesive bond were required, but also in the product itself. Producing the product in the aforesaid manner provides a single unitary structure in which the asbestos sheet material becomes in effect the outer skin of the foam. Furthermore, such a process is easily used with asbestos sheet material which has been precoated on the opposite surface with esssentially any type of coating material, even those which require high heat-curing or heat-fusing temperatures, and the foam laminate produced in the foregoing manner provides a product in which the outer skin has the surface characteristics of the coating material provided.

The thickness of the foam layer can be varied widely, depending upon the intended use of the product and also upon the type of foam employed. For example, rigid foams are usually employed in thicker layers than are flexible foams. The products are usually in sheet form and thus the foam layer has a thickness of from about 1/32 inch to about 4 inches. However, thicker foam layers can also be used, for instance, in the case of insulating blocks or panels, and also some products can employ very thin foam layers.

The resinous organic coating which is applied to the asbestos sheet in the preferred embodiments can also be of various types, including compositions based upon thermoplastic and thermosetting resins and various combinations of resins. One very important advantage of the products of the invention is that thermosetting or heat-fusible resinous coatings which require relatively high temperatures for curing or fusing are easily employed; this cannot be done with many sheet materials, such as cellulosic and other organic materials, nor can such coatings ordinarily be applied to most cellular foam substrates.

Among the various resins which can be employed in the organic coating compositions utilized are vinyl halide resins, including poly(vinyl chloride) and poly(vinyl fluoride), as well as interpolymers of such monomers with other copolymerizable monomers, such as vinyl acetate. These may be in the form of plastisols, organosols, and other dispersions in aqueous or organic solvents, or as solutions in various solvents in which the polymer is soluble.

Other coatings which are advantageously used are those based upon solutions or dispersions of vinylidene halide resins, such as poly(vinylidene chloride) and poly (vinylidene fluoride), and perhalogenated polymer resins, such as poly(tetrafluoroethylene) and poly(chlorotrifluoroethylene).

Still other useful coating compositions are alkyd resin compositions, including the well-known oil-modified glyceryl phthalate resins and oil-free saturated polyesters, as well as any other of the saturated or unsaturated alkyd resins utilized in the coatings field; compositions based upon hydrocarbon resins, such as polyethylene, polypropylene, polybutadiene, polyisobutylene and polystyrene resins, as well as interpolymers of the same, such as ethylene-propylene copolymers and ethylene-propylene-diene terpolymer resins; modified hydrocarbon resins, such as halogenated or sulfonated derivatives of the above hydrocarbon resins; thermoplastic acrylic resin coating compositions, including solution and latex compositions based upon polymers and copolymers of esters of acrylic and methacrylic acids, e.g., poly(methyl methacrylate), methyl methacrylate-lauryl methacrylate copolymers, etc., or hydroxyl-containing or carboxyl-containing acrylic polymers, which may be combined with an amine-aldehyde resin or an epoxy resin to form a thermosetting composition; and thermosetting acrylic resin compositions, such as aldehyde-modified amide interpolymers containing crosslinking functional groups such as methylol or alkoxymethyl groups, as disclosed in U.S. Pats. 2,978,437 and 3,037,963.

Still other coatings are those based upon amine-aldehyde resins, such as aldehyde condensation products of melamine, urea benzoguanamine, or a similar compound, which can be used alone or in combination with other resins; epoxy resins, including those obtained by reaction of polyphenols with epichlorohydrin, novolak epoxy resins, aliphatic and cycloaliphatic epoxides, epoxy esters, and epoxidized oils; unsaturated polyester resins, which are usually combined with copolymerizable monomers such as styrene, vinyl toluene or methyl methacrylate; silicone resins, such as organopolysiloxane resins; and phenolic resins, including phenol-aldehyde resins made from phenol or substituted phenols.

It is often advantageous to use compatible combinations of the above thermosetting and thermoplastic resins, such as, for example, combinations of acrylic resins with poly(vinylidene fluoride) resins.

Preferred coating compositions are those in which the major resinous component is a polymer of monomers consisting essentially of polymerizable compounds having a $CH_2=C<$ group. Such monomers include vinyl halides, such as vinyl chloride; vinylidene halides, such as vinylidene fluoride; and acrylic monomers, such as those mentioned above. Poly(vinylidene fluoride), alone or in combination with other resins, such as the aldehyde-modified carboxylic acid amide interpolymers described above, provide especially preferred coatings, especially for the outermost layer. Vinyl halide polymers, especially poly(vinyl chloride) and poly(vinyl fluoride), are also highly desirable. Plural coatings are very often used; these generally include a ground coat, an inked decorative coating, and a clear topcoat.

The coating composition can be in a solution in organic solvents or in water, or it can be a latex or non-aqueous dispersion. In some cases, a preformed film can be applied to the asbestos paper to provide the organic layer. In other instances, the coating composition contains no solvent medium, as is the case, for example, with acrylic sirups and unsaturated polyester resins thinned in monomers such as styrene.

The other side of the cellular foam substrate, i.e. the major surface opposite the surface which is attached to the asbestos sheet material, may be coated in certain embodiments with a layer of adhesive. The surface of the asbestos can also be coated with an adhesive in place of or in addition to the organic coating. Essentially any adhesive can be employed, but it is greatly preferred to use a pressure-sensitive adhesive. By "pressure-sensitive adhesive" is meant any adhesive which at the time of application can be applied with hand pressure and which does not require unusual curing or laminating techniques. In the usual case, the pressure-sensitive adhesive employed is a normally tacky material which has more or less permanent tack. However, contact adhesives, heat-reactivatable adhesives, solvent-reactivatable adhesives, hot melt adhesives and other types of adhesives which may not be normally or permanently tacky can also be employed under suitable conditions of use, i.e. by utilizing them in such a manner as to provide the desired adhesive properties upon contact with the substrate at the time of use.

Broadly speaking, the adhesive can be of any resinous material which provides the desired characteristics. Naturally occurring materials can be used, such as starch, dextrins, animal and vegetable proteins, natural rubber and shellac; modified natural materials are also useful, examples being cellulosics such as cellulose nitrate; polyamides from dimer acids, castor oil-based polyurethanes, etc. Among the many synthetic polymer adhesives are those based upon acrylic resins, phenolic resins, various synthetic rubbers and rubber-resin combinations, epoxies, silicons, polyamides, polyesters, vinyl alkyl esthers, polyvinyl esters, polyurethanes, polysulfides, amino resins, etc. Mixtures of resins can be used, and the adhesive may be either thermoplastic or thermosetting and may be in solution or in latex form. The choice of adhesive type depends upon considerations such as the characteristics of the foam material employed, the manner in which the adhesive is to be applied to the foam or the asbestos, the storage conditions, if any, which may be encountered, and the properties desired in the final product.

The preferred normally tacky pressure-sensitive adhesives are based on elastomeric resins, generally either natural or synthetic rubber or acrylic resins. Rubber-based pressure-sensitive adhesives are ordinarily composed of a rubber elastomer combined with a liquid or solid resin tackifier component, along with additives such as plasticizers, fillers and antioxidants. Typical rubbers used include natural rubber and butadiene-styrene (SBR) rubber, and the more usual resinous tackifiers include polyterpene resins, oil-soluble phenolic resins and petroleum hydrocarbon resins.

Because of their greater strength and generally superior properties. The preferred pressure-sensitive adhesives are based upon acrylic polymers, i.e. the major resinous component of the adhesive is a polymer in which the constituents are all or in substantial part comprised of one or more acrylic monomers. For the most part, such acrylic adhesives are based upon alkyl acrylates having an average of 4 to 12 carbon atoms in the alkyl groups. The adhesives often contain minor amounts of other monomers and particularly monomers containing a reactive functional group, such as carboxyl, hydroxyl, amido, cyano, etc. Examples are acrylic acid, acrylamide, and acrylonitrile, and non-acrylic monomers such as maleic acid or anhydride. In many cases the polymers include small or even substantial proportions of non-acrylic monomers, one of the more common being vinyl acetate.

A great many acrylic pressure-sensitive adhesive polymers are known; some examples of these are described in U.S. Pats. 2,438,195, 2,553,816, 2,557,266, 2,884,126, 2,925,174, 3,092,250, 3,189,480, 3,189,581 and 3,268,357.

In addition to the rubber-based or acrylic pressure-sensitive adhesives described above, there can also be used adhesives based upon other elastomeric resinous material. These include, for example, adheives based upon silicone resins, epoxy-based adhesives; polyvinyl alcohol adhesives; polyester adhesives; and alkyl vinyl ether adhesives.

Conventional coating compositions are used to apply the coating and the adhesive. Roll coating is fast and economical and is therefore a preferred method of applying the organic coating to the asbestos and, in some cases, the adhesive. However, other application methods, including spraying, brushing, etc. can be employed if desired. It is usually desirable to apply the adhesive by utilizing film adhesive and applying it to the foam in a transfer operation. Heat laminating or bonding with an adhesive can be employed with organic coatings in preformed film form. Both the organic coating and the adhesive may comprise more than one layer of material, this being particularly true in the case of the organic coating where it is often desirable to apply a base and then a top coat of the same or different material with, in many cases, the base coat being printed with a decorative design prior to application of the top coat. Similarly, if desired, a primer can be used under the adhesive layer or several layers of the same or different adhesive can be applied, although this is not ordinarily necessary.

Where the coating requires curing or heat fusion, this can be accomplished in any desired manner. As indicated, even very high temperatures are withstood by the nonwoven asbestos and this permits the use of coatings which cannot be successfully applied to other substrates such as wood, plastics and many metals, and which cannot otherwise be applied to most foams.

The thickness of the organic coating depends only upon the desired appearance and properties, and is chosen with reference to the particular organic coating material and materials employed. Depending upon the manner in which the product is to be used, the number of layers in the coating, and similar factors, the organic coating is usually from about 0.5 to about 15 mils in thickness.

The thickness of the pressure-sensitive adhesive layer is also not critical, and the adhesive layer need not even be continuous.

An advantage of the use of asbestos in producing foam laminates in accordance with the invention is that the asbestos can be subjected to various treatments to improve the decorative and, in some cases, functional properties of the finished product. For example, the asbestos sheet material can be calendered prior to application of the coating in order to improve its smoothness and to provide a coated product which is more receptive to printing, or the asbestos can be embossed to impart patterns or designs to the surface; this can be carried out either prior to or after the material is coated with the organic coating.

The laminates obtained in the foregoing manner have a number of unique properties. For example, such products are dimensionally stable, and have excellent heat stability and have insulating qualities, as well as being fire retardant because of the non-flammable asbestos. The degree of first retardency depends upon the particular cellular foam employed; the organic coating applied and the particular binder, if any, in the asbestos sheet material should also be considered. For best fire-retardency, the asbestos sheet material should have no binder or a non-flammable binder, such as polyvinyl chloride, and the cellular foam should be a fire-retardant foam, many of which are known. Non-flammable organic coatings include those based upon poly(vinyl chloride) and poly (vinylidene fluoride).

The invention will be described further in connection with several examples thereof which follow. The examples are illustrative of the invention and are not to be construed as imposing limitations therein. All parts and percentages are by weight and are based upon non-volatile solids content unless otherwise indicated.

EXAMPLE 1

A foamable composition is produced by mixing the following:

| | Parts by weight |
|---|---|
| Poly(vinyl chloride) resin (high molecular weight dispersion resin known as "Geon 121") | 407 |
| Dioctyl phthalate | 378 |
| Dioctyl adipate | 95 |
| Azodicarbonamide (Kempore R–125) | 15 |
| Dibasic lead phosphate | 26 |
| Lampblack | 13 |
| Ground calcium carbonate pigment | 77 |

The above composition is applied to the uncoated surface of coated asbestos paper in a 3–5 mil (wet) layer, using doctor rolls. The asbestos paper is 15 mils thick and is composed of crysotile asbestos with 15 percent by weight of acrylic elastomer binder (a copolymer of about 65 percent ethyl acrylate and 40 percent methyl methacrylate modified with about 2 percent of acrylic acid). It is coated with a 1.5 mil (dry) coating of poly(vinyl chloride) plasticized with di(isodecyl) phthalate and pigmented with titanium dioxide and silica, applied as a dispersion and baked for 60 seconds at 450° F. The coated asbestos with the foamable composition thereon is then placed in an oven at 350° F. for 10 minutes. The product is a firm, resilient foam tightly bonded to the asbestos paper in a unitary structure having highly decorative appearance and providing a highly durable surface. It is useful, for instance, as a flooring material, and when applied to a floor, with or without adhesive, it provides flame retardence, insulation qualities, sound-deadening and resilience, in addition to a durable, decorative surface.

EXAMPLE 2

Example 1 is repeated except that the asbestos paper is made without a binder and is coated with a 0.7 mil (dry) layer of poly (tetrafluoroethylene). The coating is applied as a 60 percent water dispersion (sold as "Teflon Dispersion Paste 30B") containing 6 percent alkylaryl polyether alcohol emulsifier and 0.1 percent thickener; the wet coating is heated to 350° F. to remove water (about 3 minutes) and then baked for 10 seconds at an oven temperature of 800° F. (paper temperature 680–700° F.). Foam is applied as in Example 1 and there is obtained a laminate of exceptional durability, as well as the other properties described above.

EXAMPLE 3

Example 1 is again repeated except that the asbestos paper is made with a poly(vinyl chloride) latex binder and the foamable composition contains the following:

| | Parts by weight |
|---|---|
| Poly(vinyl chloride) resin (specific viscosity 0.30) | 100 |
| Dioctyl phthalate | 100 |
| Dibasic lead phthalate | 3 |
| Azodicarbamide | 2 |

The product is baked for 5 minutes at 350° F. to produce a laminate in which the foam is of relatively low density (ca. 20 lbs./cu. ft.).

EXAMPLE 4

A rigid polyurethane foam laminate is produced using the coated asbestos paper described in Example 1 and a foamable composition which comprises a two package system using a sucrose polyol and prepolymer thereof. The sucrose polyol is the reaction product of 12 moles of ethylene oxide and 3 moles of propylene oxide per mole of sucrose, and the prepolymer is the reaction product of 214 parts of the sucrose polyol and 786 parts of toluene diisocyanate (80 percent 2,4-isomer and 20 percent 2,6-isomer). The foamable composition is as follows:

| | Parts by weight |
|---|---|
| Package A: | |
| Prepolymer | 100 |
| Polyoxyalkylene organosilicon emulsifier (X–521) | 1 |
| Trichlorofluoromethane | 28 |
| Package B: | |
| Sucrose polyol | 79.5 |
| Dimethylethanolamine | 0.6 |

Package A is cooled to 550° F., mixed with Package B and poured onto the coated asbestos paper. The mixture foams immediately (about 2 minutes) and is then cured at 150° F. for 20 minutes. The product is a tightly bonded foam-asbestos laminate of high insulating value, useful as structural or insulating panels, furniture tops and the like.

EXAMPLE 5

A flexible, high density polyurethane foam is produced from the following composition:

| | Parts by weight |
|---|---|
| Polyester polyol (Multron R–68) | 100 |
| Toluene diisocyanate (80/20) | 20.4 |
| N-ethylmorpholine | 2 |
| Aliphatic amine emulsifier (Armeen DM-60) | 0.5 |
| Sulfonated castor oil (Additive A–3) | 1.0 |
| Water | 0.9 |

This composition is foamed on 15 mil asbestos paper made with poly(vinyl chloride) latex binder and having thereon a 1 mil (dry) coating of a composition composed of 95 parts of poly(vinyl fluoride) and 5 parts of a copolymer of 70 percent ethyl acrylate and 30 percent methyl methacrylate pigmented with titanium dioxide to a pigment to binder ratio of 0.41 to 1. The product is resilient, durable and decorative, and is useful as upholstery and in similar applications.

EXAMPLE 6

Example 5 is repeated using the following polyether foam composition:

| | Parts by weight |
|---|---|
| Propylene oxide-glycerine polyether triol (OH value 56, mol. wt. 3000) | 85 |
| Toluene diisocyanate (80/20) | 47.5 |
| Tetrakis(2-hydroxyproupyl)ethylene diamine (Quadrol) | 15 |
| Water | 2.3 |
| Polyalkylsiloxane-polyoxyalkylene copolymer surfactant (DC–201) | 1.5 |
| N,N'-dimethylpiperazine | 0.9 |

The product is a medium-density flexible foam of good properties.

EXAMPLE 7

A polystyrene foam laminate is produced using the vinyl coated asbestos paper described in Example 1. A shell mold is lined with the coated asbestos and filled with preexpanded foamable polystyrene beads containing about 8 percent n-pentane as the blowing agent ("Dylite F–40"). The mold is placed in a jacketed steam autoclave and heated to 30 p.s.i. for 10 minutes and then cooled. The product is coated asbestos laminated to rigid polystyrene foam and is useful as insulating wall panels and for various other applications.

EXAMPLE 8

A self-adhesive laminate is produced using an asbestos-foam laminate prepared as in Example 1 by applying an adhesive to the exposed surface of the foam. The adhesive is an acrylic pressure-sensitive film adhesive 1 mil thick, made of an interpolymer of 70 percent 2-ethylhexyl acrylate, 21 percent vinyl acetate, 6 percent acrylic acid and 3 percent 2-cyanoethyl acrylate. The adhesive is applied by a transfer operation in which adhesive in film, coated on release paper, is pressed onto the surface of the foam. The self-adhesive product is used by peeling off the release paper and pressing the assembly onto a substrate. It can be employed, for example, as a flooring material, as wall-covering etc.

EXAMPLE 9

An uncoated asbestos paper, 10 mils thick and made with the acrylic elastomer binder described in Example 1, is employed to make an asbestos-foam laminate with the foamable composition described in Example 3. The exposed surface of the asbestos paper is then coated with a pressure-sensitive adhesive, made in accordance with U.S. 3,268,357, composed of 60 percent 2-ethylhexyl acrylate and 40 percent vinyl acetate, with a plasticity number of 2.75. The product can be adhered to various wood, metal or plastic substrates to provide a protective, insulating foam surface.

In a similar manner other foam-asbestos laminates are produced using other coated asbestos papers, other foamable compositions and other procedures. For example high-temperature resistant foams are provided by silicone foams made from organopolysiloxanes foamed with blowing agents such as methylene chloride. Other types of foams as described hereinabove can also be substituted for those of the examples, as can other adhesives, coatings and foam-producing methods.

According to the provisions of the patent statutes, there are described above the invention and what are now considered to be its best embodiments. However, within the scope of the appended claims, it is to be understood that the invention can be practiced otherwise than as specifically described.

What is claimed is:

1. A coated asbestos-foam laminate comprising asbestos sheet material coated on one major surface with a resinous organic coating composition and having the other major surface adherently bonded to an organic resinous cellular foam substrate.

2. The laminate of claim 1 in which said asbestos sheet material is non-woven asbestos sheet.

3. A laminate of claim 1 in which said cellular foam substrate is a flexible organic foam.

4. The laminate of claim 1 in which said cellular foam substrate is a rigid organic foam.

5. The laminate of claim 1 in which said cellular foam substrate is selected from the group consisting of vinyl halide polymer foams, polyurethane foams and polystyrene foams.

6. The laminate of claim 1 in which said organic coating composition contains as the major resinous component a heat-curable or heat-fusible resin.

7. The laminate of claim 6 in which said coating composition contains as the major resinous component a member of the group consisting of polyvinylidene fluoride, vinyl halide polymers and poly(tetrafluoroethylene).

8. A self-adhesive coated asbestos-foam laminate comprising an organic resinous cellular foam in sheet form, said foam having a layer of adhesive on one major surface and having its other major surface bonded to asbestos sheet material which is coated with a resinous organic coating on the major surface and opposite that to which said foam is bonded.

9. The laminate of claim 8 in which said adhesive is a normally tacky pressure-sensitive adhesive.

10. The laminate of claim 8 in which said cellular foam is selected from the group consisting of vinyl halide polymer foams, polyurethane foams and polystyrene foams.

11. An asbestos-foam laminate comprising asbestos sheet material having one major surface bonded to an organic resinous cellular foam substrate and having a layer of adhesive on its other major surface.

12. The laminate of claim 11 in which said asbestos sheet material is non-woven asbestos sheet.

13. The laminate of claim 11 in which said adhesive is a normally tacky pressure sensitive adhesive.

14. The laminate of claim 11 in which said cellular foam is selected from the group consisting of vinyl halide polymer foams, polyurethane foams and polystyrene foams.

References Cited

UNITED STATES PATENTS

| | | | |
|---|---|---|---|
| 2,788,052 | 4/1957 | Schulman | 161—205 |
| 3,262,827 | 7/1966 | Kallander et al. | 161—167 |

WILLIAM J. VAN BALEN, Primary Examiner

U.S. Cl. X.R.

156—244, 278, 305; 161—161, 167, 205, 406